United States Patent
McGee et al.

(10) Patent No.: US 10,248,191 B2
(45) Date of Patent: Apr. 2, 2019

(54) VIRTUAL RIGID FRAMEWORK FOR SENSOR SUBSYSTEM

(71) Applicant: Microsoft Technology Licensing, LLC, Redmond, WA (US)

(72) Inventors: Nicholas Damien McGee, Redmond, WA (US); Quentin Simon Charles Miller, Sammamish, WA (US); Lev Cherkashin, Redmond, WA (US); Michael Samples, Redmond, WA (US); Drew Edward Steedly, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 67 days.

(21) Appl. No.: 15/376,521

(22) Filed: Dec. 12, 2016

(65) Prior Publication Data
US 2018/0164878 A1 Jun. 14, 2018

(51) Int. Cl.
*G06F 3/00* (2006.01)
*G02B 27/01* (2006.01)
(Continued)

(52) U.S. Cl.
CPC ......... *G06F 3/012* (2013.01); *G02B 27/0093* (2013.01); *G02B 27/0103* (2013.01); *G02B 27/017* (2013.01); *G02B 27/0172* (2013.01); *G06F 3/005* (2013.01); *G06F 3/011* (2013.01); *G06F 3/013* (2013.01);
(Continued)

(58) Field of Classification Search
CPC ..... G06F 3/012; G06F 3/005; G02B 27/0172; G02B 27/0103; G02B 2027/0138; G02B 2027/0174; G02B 2027/0178
See application file for complete search history.

(56) References Cited

U.S. PATENT DOCUMENTS 2,825,977 A * 3/1958 Fayers ................... G01C 17/30
33/360
4,945,305 A * 7/1990 Blood ..................... F41G 3/225
324/207.11
(Continued)

FOREIGN PATENT DOCUMENTS

WO 2015123771 A1 8/2015

OTHER PUBLICATIONS

Maeda, et al., "Tracking of User Position and Orientation by Stereo Measurement of Infrared Markers and Orientation Sensing", In Proceedings of the Eighth International Symposium on Wearable Computers, vol. 1, Oct. 31, 2004, 8 pages.
(Continued)

*Primary Examiner* — Mihir K Rayan
(74) *Attorney, Agent, or Firm* — Arent Fox LLP

(57) ABSTRACT

An apparatus for dynamically determining a displacement of a target sensor in an electronic system is disclosed. The apparatus can comprise a non-line-of-sight sensor rigidly mounted on or proximate to the target sensor and configured to measure a parameter that varies with the displacement of the target sensor. The apparatus further can comprise at least one processor coupled to the non-line-of-sight sensor and configured to compute the displacement of the target sensor based on the parameter, and to compute an adjustment value based on the computed displacement.

26 Claims, 10 Drawing Sheets

(51) Int. Cl.
*G06F 3/01* (2006.01)
*G02B 27/00* (2006.01)
(52) U.S. Cl.
CPC ........... *G02B 2027/0138* (2013.01); *G02B 2027/0174* (2013.01); *G02B 2027/0178* (2013.01)

(56) References Cited

U.S. PATENT DOCUMENTS

| | | | | |
|---|---|---|---|---|
| 5,600,330 | A * | 2/1997 | Blood | G01S 5/0247 324/207.15 |
| 6,720,876 | B1 * | 4/2004 | Burgess | G01S 5/0289 340/10.1 |
| 7,130,754 | B2 | 10/2006 | Satoh et al. | |
| 7,190,331 | B2 | 3/2007 | Genc et al. | |
| 7,312,766 | B1 * | 12/2007 | Edwards | G02B 27/017 248/115 |
| 7,787,012 | B2 * | 8/2010 | Scales | A63F 13/10 348/158 |
| 8,587,659 | B1 * | 11/2013 | Socolinsky | H04N 5/23293 318/47 |
| 8,847,137 | B2 | 9/2014 | Kennedy | |
| 9,030,495 | B2 | 5/2015 | McCulloch et al. | |
| 2006/0256110 | A1 | 11/2006 | Okuno et al. | |
| 2007/0258658 | A1 * | 11/2007 | Kobayashi | G06T 15/20 382/276 |
| 2010/0109975 | A1 * | 5/2010 | Larson | G02B 27/017 345/8 |
| 2012/0075168 | A1 * | 3/2012 | Osterhout | G02B 27/017 345/8 |
| 2012/0306725 | A1 * | 12/2012 | Hilkes | G09G 5/00 345/8 |
| 2014/0139551 | A1 * | 5/2014 | McCulloch | G09G 5/377 345/633 |
| 2015/0097719 | A1 | 4/2015 | Balachandreswaran et al. | |
| 2015/0316767 | A1 | 11/2015 | Ebstyne et al. | |
| 2016/0033768 | A1 | 2/2016 | Pedrotti et al. | |
| 2016/0131902 | A1 | 5/2016 | Ambrus et al. | |
| 2016/0154241 | A1 | 6/2016 | Alhashim | |

OTHER PUBLICATIONS

Gottschalk, et al., "Autocalibration for Virtual Environments Tracking Hardware", In Proceedings of the 20th Annual Conference on Computer Graphics and Interactive Techniques, Aug. 2, 1993, pp. 65-72.

Genc, et al., "Optical See-Through HMD Calibration: A Stereo Method Validated with a Video See-Through System", In Proceedings of IEEE and ACM International Symposium on Augmented Reality, Oct. 5, 2000, pp. 165-174.

"G4", Retrieved on: Jul. 7, 2016 Available at: http://polhemus.com/_assets/img/G4_Brochure.pdf.

"Fastrak—The First and Easy Digital Tracker", Retrieved on: Jul. 7, 2016 Available at: http://polhemus.com/_assets/img/FASTRAK_Brochure.pdf.

"Aurora", Retrieved on: Jul. 7, 2016 Available at: http://www.ndigital.com/msci/products/aurora/.

"Sixense", Retrieved on: Jul. 7, 2016 Available at: http://sixense.com/.

"Flock of Birds Six Degrees of Freedom Measurement Device", Retrieved from <<http://www.5dt.com/downloads/3rdparty/fobtechnicalspec.pdf>>, Mar. 22, 2016, 10 Pages.

Auer, et al., "Building a Hybrid Tracking System: Integration of Optical and Magnetic Tracking", In Proceedings of Second IEEE International Workshop on Augmented Reality, Oct. 20, 1999, 10 Pages.

"International Search Report and Written Opinion Issued in PCT Application No. PCT/US2017/064978", dated May 4, 2018, 13 Pages.

* cited by examiner

VIRTUAL RIGID FRAMEWORK FOR SENSOR SUBSYSTEM

BACKGROUND

Virtual reality (VR) and augmented reality (AR) visualization systems are starting to enter the mainstream consumer electronics marketplace. Near-to-eye display (NED) devices, such as head-mounted display (HMD) devices, can be used to display AR or VR content to users. AR devices may include transparent display elements that enable a user to see virtual content transposed over the user's view of the real world. Displayed objects that appear to be superimposed over the user's real-world view are commonly referred to as virtual objects or "holographic" objects. VR and AR visualization systems can provide users with entertaining, immersive three-dimensional (3D) virtual environments in which they can visually (and sometimes audibly) experience things they might not normally experience in real life.

At least some HMD devices include one or more sensors of various types. For example, some HMD devices include sensors such as cameras to facilitate 3D surface mapping, user head-tracking, etc. These cameras generally must be positioned and oriented very precisely in the device in order to provide a satisfactory experience for the user. Yet normal use of the device over time can cause the cameras to move to varying degrees, depending on the design of the device. A challenge in designing an HMD device, therefore, is providing a sensor platform that is easily calibrated in the factory and that maintains a high degree of accuracy over the lifetime of the device. Without those characteristics, an HMD's performance can quickly break down into unpleasant or uncomfortable experiences for the user, where rendered content blends poorly with the user's view of the real world.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
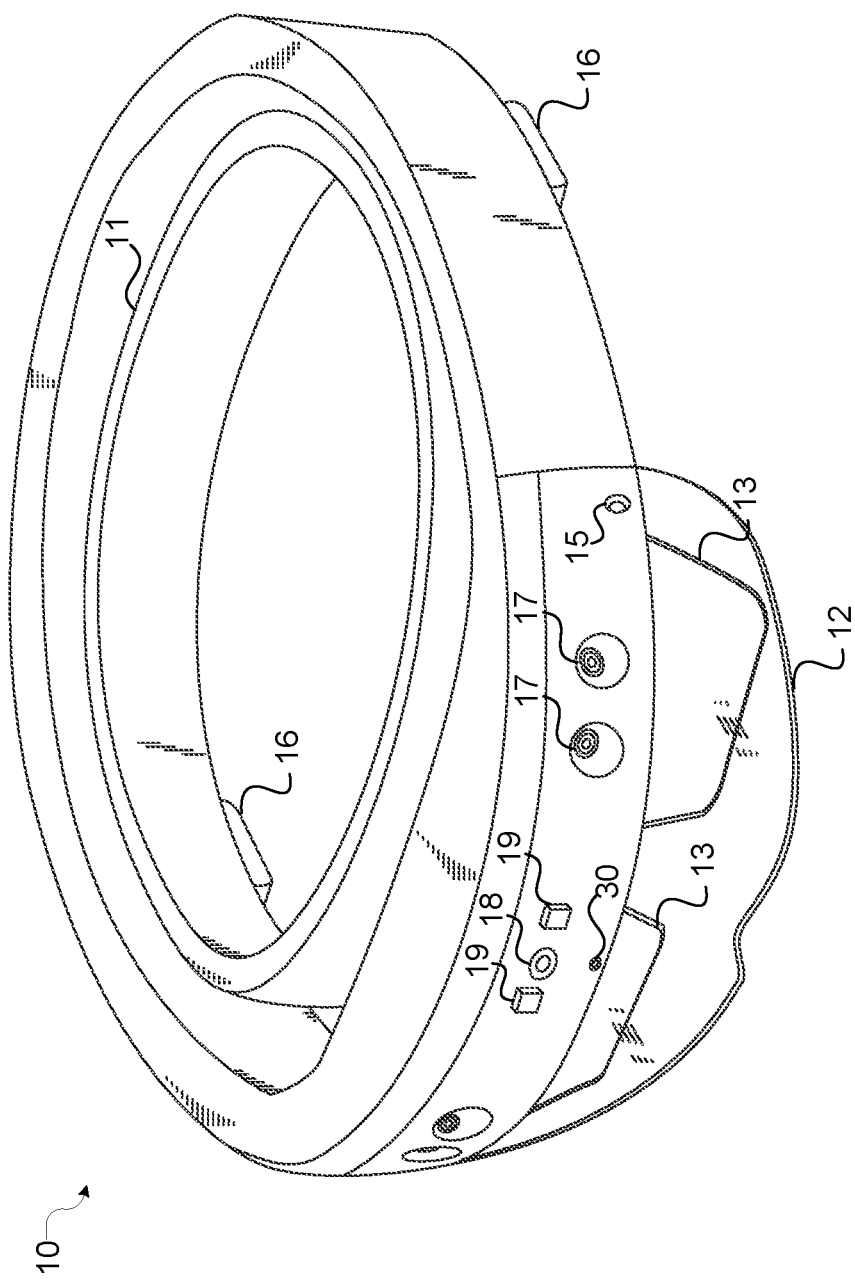
FIG. 1 illustrates a perspective view of an example of an HMD device.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

As noted above, one challenge in designing an AR- or VR-capable HMD device is providing a sensor platform that is easily calibrated in the factory and that maintains a high degree of accuracy over the lifetime of the device. One possible approach to meeting this challenge is to equip such a device with a rigid support structure for the sensors, to prevent any misalignment between the sensors and the rest of the headset or between different sensors. However, such structures tend to be bulky and have thus far met with limited success in avoiding misalignment. Additionally, as form factors for HMDs become more streamlined to meet competitive demands, they will become increasingly less rigid and have less room for sensors and support structures. Furthermore, rigidity requirements encourage colocation of sensors (to minimize the size of structures and potential for deformation), which tends to stifle innovation in sensor layout.

A software-based solution to sensor misalignment is one possible alternative to rigid support structures. Software potentially can be used during operation of the device to computer sensor misalignment and correct for it in real-time. However, a software-based solution is not as accurate as a truly rigid system, and it requires tradeoffs in computing resources and power consumption.

Accordingly, introduced here is a solution that overcomes these and other disadvantages. The solution eliminates the challenges of building rigid sensor support structures by providing sensor modules that have spatial awareness. The sensors are capable of sensing their instantaneous rigid transform in relation to a common reference frame at least every time a measurement is taken. In certain embodiments, every sensor in a given subsystem is able to measure continually its position relative to a common reference point (a transmitter). The reference point becomes the center of the sensor system (the "rig") and a non-line-of-sight "virtual rigid framework (VRF)" is established between all sensors in the subsystem and the transmitter. In certain embodiments, magnetic tracking (e.g., sensing of a magnetic field) is employed to track the positional (locational) and/or orientational (angular) displacement of each sensor relative to the VRF. Appropriate adjustments can be applied to computations and/or to generated images based on the detected displacements. Optionally, an inertial measurement unit (IMU) can be provide and mounted so as to be rigidly coupled to the transmitter, to allow for high frequency corrections to displacement measurements. This approach creates opportunities for many new computer vision based scenarios, including more-streamlined headset form factors, more-sophisticated input devices, and portable holographic capture stages, to name just a few.

Hence, the solution introduced here includes an apparatus and a method for dynamically determining a displacement (e.g., a misalignment) of a given sensor in an electronic system, thereby enabling high-frequency correction for such displacement in real-time. The electronic system can be, for example, an NED device such as an HMD device designed for AR or VR applications. However, it is envisioned that the technique introduced here can be applied advantageously in many different types of electronic devices and systems. The given sensor ("target sensor") can be a camera, for example, such as a head-tracking camera on an HMD device. The term "target sensor" herein refers to a sensor whose position and/or orientation is to be tracked.

The apparatus introduced here can comprise a non-line-of-sight sensor mounted on or proximate to (i.e., less than one centimeter from) a target sensor, tightly mechanically coupled to the target sensor, and configured to measure a parameter that varies with the displacement (angular and/or translational) of the target sensor. The non-line of sight sensor can be or include, for example, a receiver coil that senses a magnetic field produced by a transmitter coil. The apparatus further can comprise at least one processor coupled to the non-line-of-sight sensor and configured to compute the displacement of the target sensor based on the parameter, and to compute an adjustment value based on the computed displacement.

Before further discussing this technique, it is useful to consider an example of a device in which the technique can be implemented. FIG. 1 shows a perspective view of an example of an AR-capable HMD device that can implement the technique introduced here. The HMD device 10 includes a headband 11, by which the HMD device 10 can be worn on a user's head. Attached to the headband 11 (directly or indirectly) is a transparent protective visor 12 that encloses one or more transparent waveguides 13, each of which can overlay holographic images on the user's view of his real-world environment, for one or both eyes (e.g., by directing emitted light into the user's eyes). The protective visor 12 also encloses various circuitry (not shown) and various sensors.

In the illustrated embodiment, the sensors include: one or more microphones 15 to input speech from the user (e.g., voice commands); one or more visible-spectrum cameras 17 for use in user head tracking (i.e., tracking the user's head position and orientation in real-world space); one or more infrared (IR) spectrum depth cameras 18 for use in surface reconstruction to model the surfaces in the user's real-world environment and/or hand gesture recognition; and one or more visible spectrum video cameras 30 for use in capturing standard video of what the user sees. The HMD device 10 further includes one or more audio speakers 16 and one or more IR illumination sources 19 for use with the depth camera(s) 18. The HMD device 10 also includes circuitry (not shown), which may be contained within the visor 12, to control at least some of the aforementioned elements and perform associated data processing functions (e.g., speech and gesture recognition and display generation). The circuitry may include, for example, one or more memories and one or more processors, such as a central processing unit (CPU), graphics processing unit (GPU) and/or holographic processing unit (HPU). Note that in other embodiments the aforementioned components may be located in different locations on the HMD device 10. Additionally, some embodiments may omit some of the aforementioned components and/or may include additional components not mentioned above.

The technique introduced here can be used to maintain calibration of the positions and orientations of any one or more of the above-mentioned sensors, such as the head-tracking cameras 17. To facilitate description, the example of a camera is used henceforth in this description as a sensor to be calibrated. It will be understood, however, that the technique can be similarly applied to any of various other types of sensors or sensor subsystems.

In calibrations for an HMD device, one can compute "intrinsic" parameters and/or "extrinsic" parameters for each sensor. In a camera, for example, intrinsic parameters can be a distortion and projection model, $\pi$. For an IMU, they can be a matrix containing Scale, Bias, and Mixing Matrix. Extrinsic parameters can be Rotation and Translation, $[R,t]_{Rig}^{Camera}$. One possible reason to compute these parameters for a camera on an HMD is so that 3D points in space can be related to camera image pixels. The following equation and its inverse can be used to transform between 3D space and camera image space:

$$\begin{bmatrix} u \\ v \\ 1 \end{bmatrix}^{camera} = \pi \left( \left[ [R,t]_{Rig}^{Camera} \cdot [R,t]_{World}^{Rig} \cdot \begin{bmatrix} x \\ y \\ z \end{bmatrix}^{World} \right] \right)$$

where u and v are camera image coordinates and $[R,t]_{World}^{Rig}$ is computed by the tracking system. To implement a virtual rigid framework (VRF) that can sense 6 DOF transformations, one would calibrate it ahead of time to understand the relationship between the "target sensor" (the sensor to be tracked) and the VRF receiver that is mounted to it. This can take the form of a 6DOF transform, $[R,t]_{VRF\ Receiver}^{Camera}$. When the device is in use, the system can use the VRF to compute the transform from the VRF transmitter to the VRF receiver, $[R,t]_{VRF\ Transmitter}^{VRF\ Receiver}$.

Then, the equation at runtime for mapping between 3D space and camera image space becomes:

$$\begin{bmatrix} u \\ v \\ 1 \end{bmatrix}^{camera} = \qquad (1)$$

$$\pi \left( \left[ [R,t]_{VRF\ Receiver}^{Camera} \cdot [R,t]_{VRF\ Transmitter}^{VRF\ Receiver} \cdot [R,t]_{World}^{VRF\ Transmitter} \cdot \begin{bmatrix} x \\ y \\ z \end{bmatrix}^{World} \right] \right)$$

A similar approach can be taken with IMU measurements.

A VRF that is not capable of sensing all 6DOF between the transmitter and receiver is still useful and can improve the accuracy of an autocalibration algorithm. An autocalibration algorithm can minimize the error in an equation, such as:

$$\text{Error} = \pi \left( \left[ [R,t]_{Rig}^{Camera} \cdot [R,t]_{World}^{Rig} \cdot \begin{bmatrix} x \\ y \\ z \end{bmatrix}^{World} \right] \right) - \begin{bmatrix} u \\ v \\ 1 \end{bmatrix}_{detected}$$

The term $[R,t]_{Rig}^{Camera}$ in this equation can be modified to minimize the error of the overall equation.

Suppose, however, that a VRF is only capable of sensing three degrees of freedom orientation (as would be the case if a pair of gyros were used) and not translation. For that scenario the equation can be modified to solve only for translation, for example, as follows:

$$\text{Error} = \left| \pi\left( \left( [1, t]_{Rig}^{Camera} \cdot ([R, 0]_{Rig}^{Camera})_{VRF} \cdot [R, t]_{World}^{Rig} \cdot \begin{bmatrix} x \\ y \\ z \end{bmatrix}^{World} \right) \right) - \begin{bmatrix} u \\ v \\ 1 \end{bmatrix}_{detected} \right|$$

This makes the optimization less computationally intense, and fewer degrees of freedom also makes it more accurate. This can be done with any combination of axes sensed by the system, so if the VRF senses range and a single axis of rotation, it would have a similar form.

One can also use a VRF even if its sensing capability is not accurate enough to use directly as in equation (1) above. In that case, one can add calibration parameters for the VRF into the optimization and minimize them along with the target sensor calibration.

An equation that incorporates this can be as follows, where the function $f$ transforms raw data from the VRF system into a 6DOF pose using some input calibration parameters that the system could optimize:

$$\text{Error} = \left| \pi\left( \left( [R, t]_{VRF}^{Camera} \cdot f(\text{Raw Data}, VRF \text{ Calibration}) \cdot [R, t]_{World}^{Rig} \cdot \begin{bmatrix} x \\ y \\ z \end{bmatrix}^{World} \right) \right) - \begin{bmatrix} u \\ v \\ 1 \end{bmatrix}_{detected} \right|$$

Alternatively, the system might only optimize camera extrinsic parameters but use the VRF estimates of pose to penalize unlikely solutions, where the function g is a loss function that operates on a difference between transformations:

$$\text{Error} = \left| \pi\left( \left( [R, t]_{Rig}^{Camera} \cdot [R, t]_{World}^{Rig} \cdot \begin{bmatrix} x \\ y \\ z \end{bmatrix}^{World} \right) \right) - \begin{bmatrix} u \\ v \\ 1 \end{bmatrix}_{detected} \right| +$$

$$g\left( [R, t]_{Rib}^{Camera} \cdot [R, t]_{VRF}^{Camera-1} \right)$$

As mentioned above, the technique introduced here in certain embodiments uses magnetic tracking. In at least some such embodiments, the system includes at least a magnetic transmitter antenna, a magnetic receiver antenna, transmitter electronic and receiver electronics. Optionally the magnetic system may also include a reference antenna. The magnetic transmitter antenna contains one or more coils, each of which can be a separate component or integrated on a printed circuit board (PCB). The magnetic receiver antenna includes multiple coils, each of which can be a separate component, integrated on a PCB or an internal part of a sensor to be tracked (e.g., a voice coil of the auto-focus mechanism of a camera). Each magnetic receiver coil is rigidly attached to the sensor to be tracked. The transmitter includes electronics for driving the transmitter antenna. The electronics may be hardwired or programmable or a combination thereof. The receiver includes electronics for processing signals picked up by the receiver antenna. The receiver electronics also may be hardwired or programmable or a combination thereof. The reference antenna, if provided, is also a magnetic receiver antenna, but is installed in a reference physical location, to provide the ability for self-calibration of the magnetic system, and to provide more precise measurement by enabling comparison of data from the reference antenna and receiver antenna of the tracked sensor.

To better understand operation of the system, assume that a device (e.g., an HMD device) includes Nt of transmitter coils and includes Nr receiver coils for each sensor to be tracked. The transmitter antenna coils emit low-frequency modulated or non-modulated signals. Different coils may use different methods of separation, such as frequency division multiple access (FDMA), time division multiple access (TDMA), code division multiple access (CDMA), or other suitable technique. The receiver measures the received signal at each receiver coil for each transmitter coil. There should be Nr*Nt values per sensor. In a typical case, Nt=3 and Nr=3, but that is not necessary the case. For example, there may instead be four transmitter antennas and two receiver antennas.

The receiver signal magnitude depends on the distance between the receiver and transmitter coils, their relative orientations and the environment (e.g., metals and ferromagnetic materials affecting the magnetic field). There are at least two possible methods of recovering relative position and orientation of the coils from measured values: 1) Using previously measured calibration data, and 2) Numerically resolving a system of equations for the magnetic field strength for every coil.

Using previously measured calibration data may be advantageous, as it takes into account all environment factors automatically. Once per design the following data are collected: the magnetic field reading when the tracked object is displaced from its initial position and orientation. During actual use, a lookup is made through a table of the collected design data to find the best match. To obtain better accuracy, interpolation (linear, polynomial or other) can be done to determine the best match between the recovered position/orientation and magnetic values.

Alternatively, the approach of numerically resolving a system of equations for the magnetic field strength for every coil can be used. The formula for magnetic field strength, B(r), can be stated as follows:

$$B(r) = \frac{\mu_0}{4\pi} \left( \frac{3r(m \cdot r)}{|r|^3} - \frac{m}{|r|^3} \right)$$

where r is the distance between the receiver and transmitter coils, $\mu_0$ is the magnetic constant equal to $4\pi \times 10^{-7}$ H·m, and m (vector) is the magnetic moment of the transmitter coil.

It is necessary to find a solution only in close vicinity to the original position of the tracked sensor, which significantly simplifies the calculation process and resolves the ambiguities resulting from the symmetry of the magnetic field. More specifically, in many embodiments it may be known that a sensor is unlikely to rotate 180 degrees, since tracking is on a much smaller scale of motion, e.g., on the order of one degree of rotation and one mm of translation.

To increase the accuracy of the measurement, statistical processing of the data may be used: The data distribution of measurements collected over a long period of time may provide additional accuracy.

Figure 2:
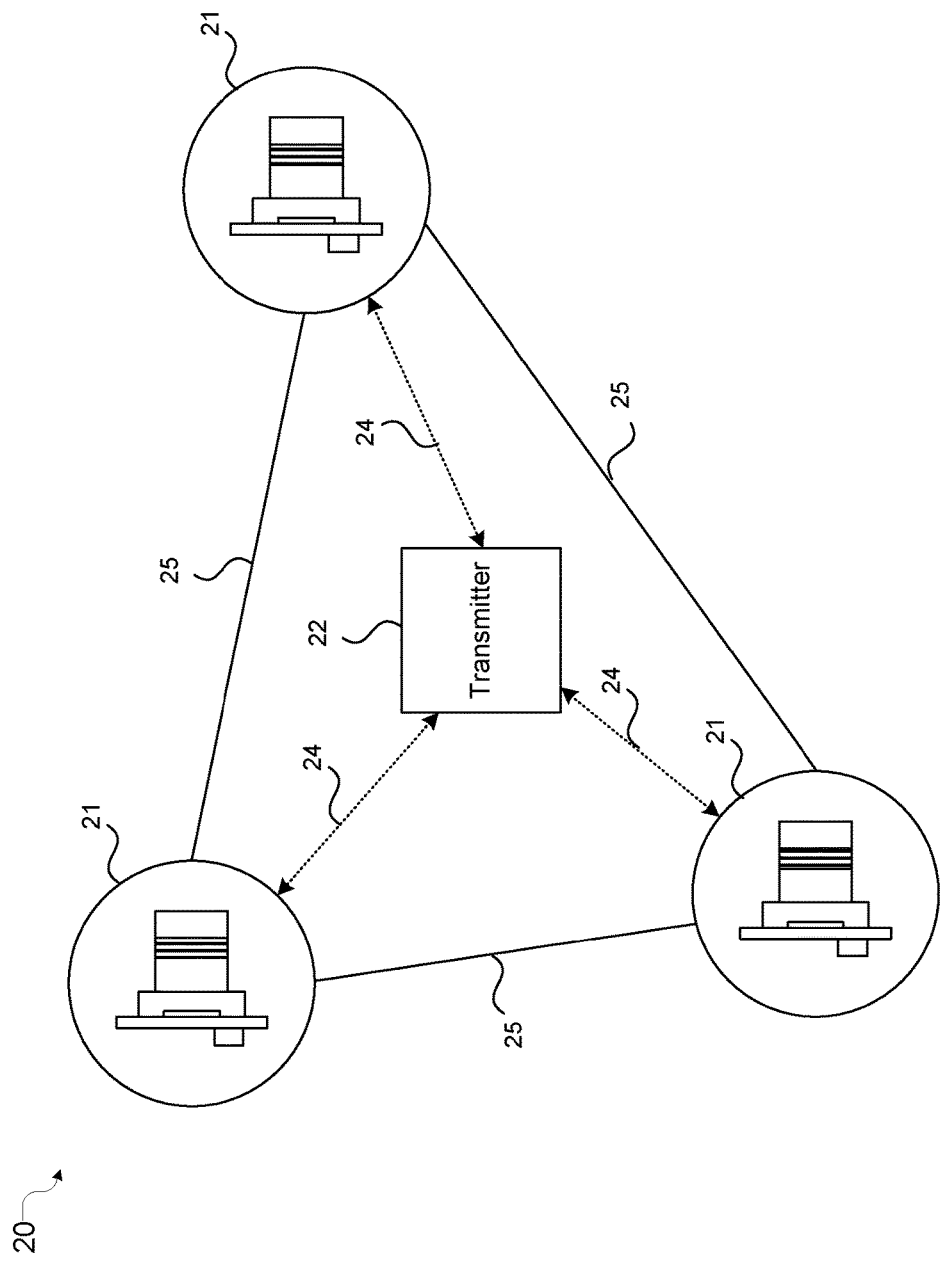
FIG. 2 schematically illustrates a sensor subsystem in a non-line-of-sight virtual rigid framework.

The technique is now further explained with reference to FIG. 2. A sensor subsystem 20 includes several sensor modules, namely, camera modules 21. Each camera module 21 includes is able to measure continually its position relative to the transmitter 22, which is the common reference point. The transmitter 22 is the center of the "rig," and a "virtual rigid framework" 25 is established between all camera modules 21 in the subsystem 20, by use of wireless communication 24 between the transmitter 22 and each camera module 21. Appropriate adjustments can be applied to computations and/or generated images based on the detected displacements. Optionally, an IMU (not shown) can be provide and mounted so as to be rigidly coupled to the transmitter 22, to allow for high frequency corrections to displacement measurements.

In certain embodiments, magnetic tracking (e.g., sensing of magnetic field) is employed to track the positional or orientational displacement of each sensor relative to the framework. This involves non-line-of-sight tracking of positional and orientational displacement of the target sensors (e.g., cameras), which provides greater flexibility in locating sensors within the containing device than a line-of-sight (e.g., optical) tracking technique could provide. Magnetic field based tracking operates using high frequency oscillations in field and is insensitive to interference outside of the frequency range. Furthermore, the impact of external interference decreases proportionally to the cube of the distance from the interference source, making this approach robust against such interference.

In other embodiments, however, other types of tracking methods may be used, which may include line-of-sight tracking, non-line-of-sight tracking (e.g., laser based), or a combination thereof. For example, IMUs, though more expensive, could also be used to measure at least some of the above-mentioned parameters. It is possible to compute rotation between a pair of gyros very accurately. The accelerometer of an IMU may allow additional constraining of the distance between two sensors. It should be noted, however, that IMUs tend to be sensitive to mounting conditions, and their performance tends to vary with temperature.

In embodiments that use magnetic tracking, the transmitter 22 can be or include one or more coils coupled to a current source. Each target sensor (e.g., camera) has at least one receiver (also called "detector"), such as a magnetic field sensitive coil, built integrally with the target sensor or mechanically coupled tightly to the target sensor or in close proximity to the sensor (e.g., within one centimeter). Each receiver also is or includes a separate sensor, i.e., a sensor of positional and/or orientational displacement of a target sensor. A single receiver coil and transmitter coil provides data sufficient to compute displacement of the target sensor in two orientation angles and distance to the transmitter, which can be computed using conventional mathematical techniques. Additional receive coils can be used to increase accuracy of the system through joint optimization. For example, three receiver coils oriented orthogonally to each other and tightly coupled to or integral with the target sensor can be used to detect positional and orientational displacement of the target sensor in 6DOF. Additional transmitter coils can be used to further increase accuracy. Magnetic field based tracking systems suitable for this purpose (e.g., with sufficient accuracy and small enough form factor) are available today off-the-shelf, but are not thought to have been used or proposed for tracking or calibration of other sensors, as introduced herein.

Figure 3:
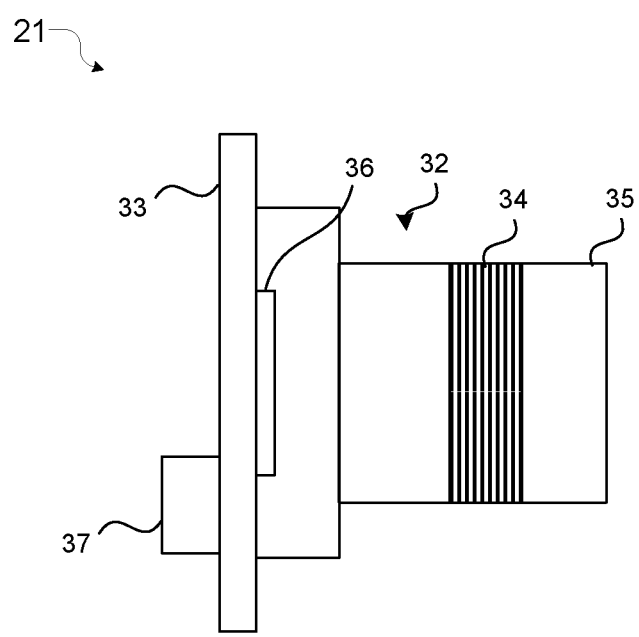
FIG. 3 illustrates a camera and associated magnetic field sensor.

FIG. 3 shows an example of how a coil can be integrated with a camera. A camera module 21 includes a miniature camera 30 coupled to a printed circuit board (PCB) 33. A receive coil 34 can be wrapped around and integrated with at least part of the lens barrel 35 of the camera 30, to receive the magnetic field generated by the transmitter 22. Note that it may be possible to use voice coil technology used for autofocus modules to integrate receivers into camera barrels. Alternatively, the receive coil 34 could be mounted on PCB 33 next to the camera 30. The camera 30 can be mounted to the PCB 33, which can be mounted at any convenient location in the containing device. A detector circuit module 36 can be mounted to the PCB 33 and electrically coupled to the coil 34, and configured to detect changes in the magnetic field (generated by the transmitter) experienced at the coil 34. Data generated by the detector circuit module 36 is passed to a surface-mount technology (SMT) communication interface 37, which passes the data to an off-board processor (not shown). A pose (position and orientation) measurement can be taken each time a reading is taken from the sensor (e.g., every time a frame is captured from the camera 30), or it can be taken more or less frequently if desired. For example, if high-frequency real-time position/orientation measurements are impractical or undesirable, they can be acquired in long-duration measurement sessions (e.g., several minutes), and statistical methods can be used to improve their accuracy.

Figure 4:
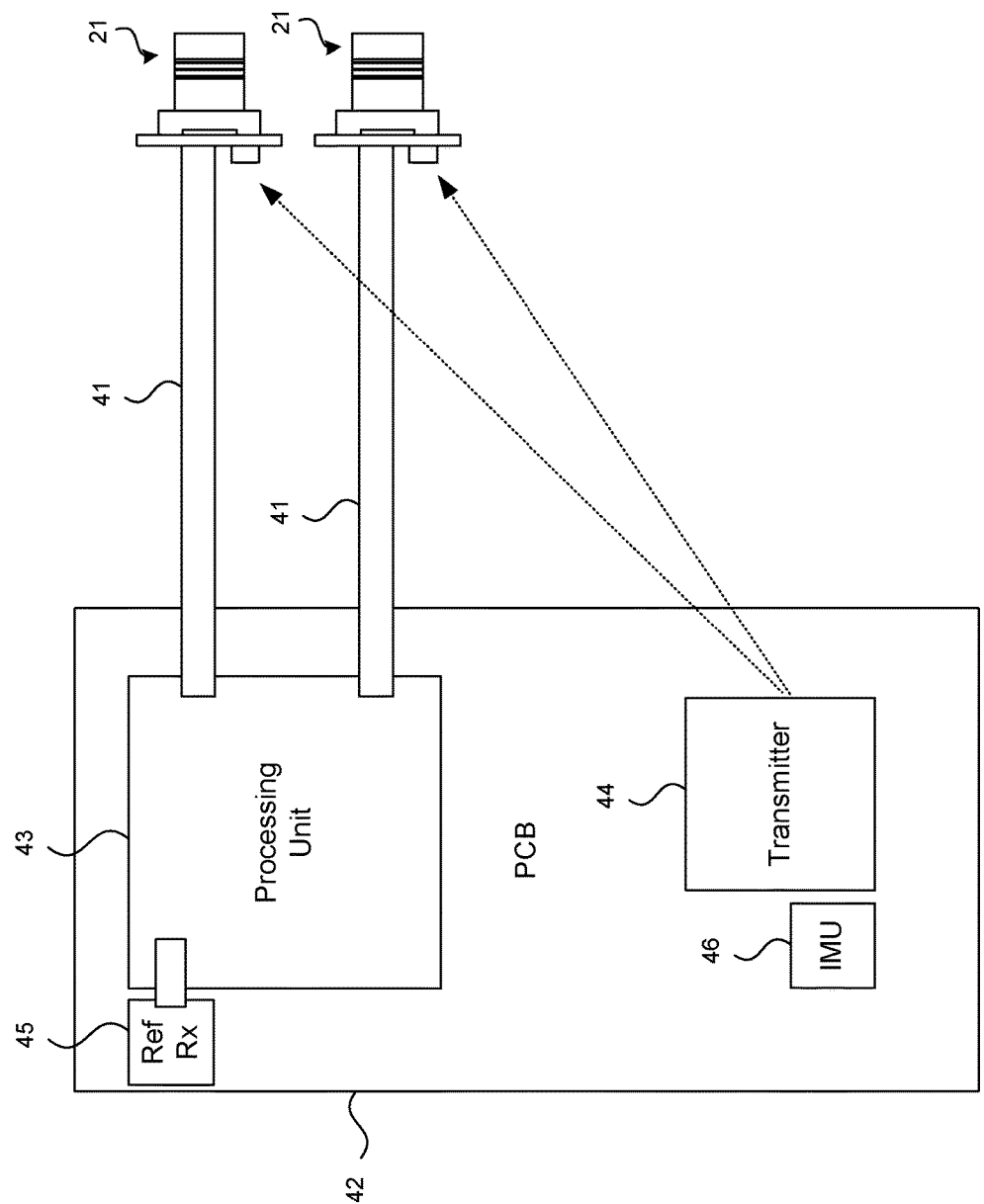
FIG. 4 illustrates an implementation for coupling multiple cameras and associated sensors to a transmitter and related components in a non-line-of-sight virtual rigid framework.

FIG. 4 illustrates how camera modules such as that shown in FIG. 3 can be coupled with a transmitter and related components. Specifically, each camera module 21 can be coupled via a flex circuit 41 to a processing unit 43 on a PCB 42. Each such flex circuit 41 may carry the image data from the corresponding camera module 21 as well as the displacement data from the camera's associated displacement sensor. The processing unit 43 computes an adjustment (correction) value based on the displacement data from each displacement sensor. The adjustment (correction) value may be used to interpret the data from the image. Alternatively, it may be used as a direct adjustment of the generated image data, or it may be an adjustment of other data used in or related to the process of generating images (e.g., user head position/orientation). The processing unit 43 may be, for example, an HPU, GPU or main CPU of the headset.

In the illustrated embodiment, the transmitter 44, optional reference receiver 45 and an optional IMU 46 are also mounted on the PCB 42. Although magnetic transmitters tend to be relatively large, size scales with the designed range of transmission. For a short range system such as described here, the transmitter 44 can be packaged as an SMT component and built onto the headset's main logic board, which may be made of thermally stable FR4, for example. The optional IMU 46 is mounted as close as possible and tightly to the transmitter 44 on the PCB 42 and is used to augment the magnetic system, allowing estimation of shared rotations between all receivers. For HMD applications, the transmitter 44 is preferably placed very close to the receivers, allowing for highly accurate tracking.

Note that for greatest accuracy, the magnetic transmitter/receiver subsystem also must be kept in calibration. One way to accomplish this is to build a reference receiver into the system at a precisely known distance from the transmitter 44. The reference receiver 45, therefore, can be used to maintain calibration of signal intensity from the transmitter 44 in the illustrated embodiment. Further, it is possible to use a known distance between the magnetic receivers as a reference to constrain transmitter parameters. For example, magnetic field information with some additional degrees of freedom, such as optical information, can be used to constrain target sensor position in an auto-calibration algorithm. To accomplish this, one can use a nonlinear optimization that minimizes an error function, for example.

Typically one needs to resolve 6DOF per sensor (three positional and three orientational). Consequently, three transmitter antenna coils and three receiver antenna coils will provide sufficient data (e.g., nine values) to fully resolve position and orientation. However, one can use additional coils (e.g., five transmitter coils and three receiver coils) to provide more data, which can be used to improve accuracy and provide auto-calibration. For example, assume that identical transmitter coils (not shown) are symmetrically placed on the center line of the device. A receiver coil of known orientation may assume that it is also located on the center line when the signals from the two transmitter coils are equal. Alternatively, one can use a reference receiver placed at a reference position on the center line and electronically match the transmitter power for the two transmitter coils to be equal. This will compensate for any manufacturing difference between the two transmitter coils. Hence, the extra variables provided by additional receiver and transmitter coils allow automatic compensation for the manufacturing variability of parameters without the need for extra calibration.

Figure 5:
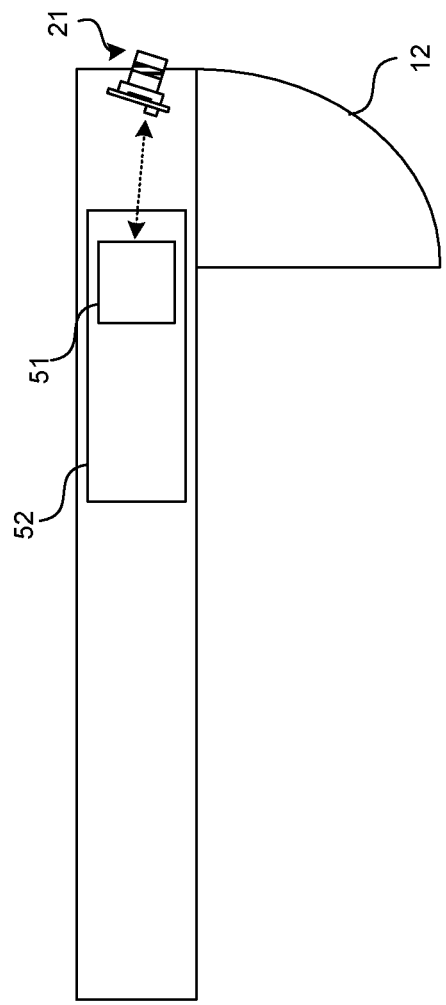
FIG. 5 shows an example of how a sensor with associated tracking sensor and transmitter can be mounted on an HMD device.

FIG. 5 illustrates an example of how this technique can be employed on the HMD device ("headset") 10 of FIG. 1. A camera (sensor) module 21 with integrated coil is mounted to a desired location on the headset 10. The transmitter 51 (including a transmit coil) is separately mounted to a PCB 52 on the headset 10. With current magnetic field generation/detection technology, the transmitter 51 can be located essentially anywhere on the headset 10 and still provide sufficient accuracy. Note that the transmitter 51 can be used for position/orientation calibration of additional sensors (not shown).

Figure 6:
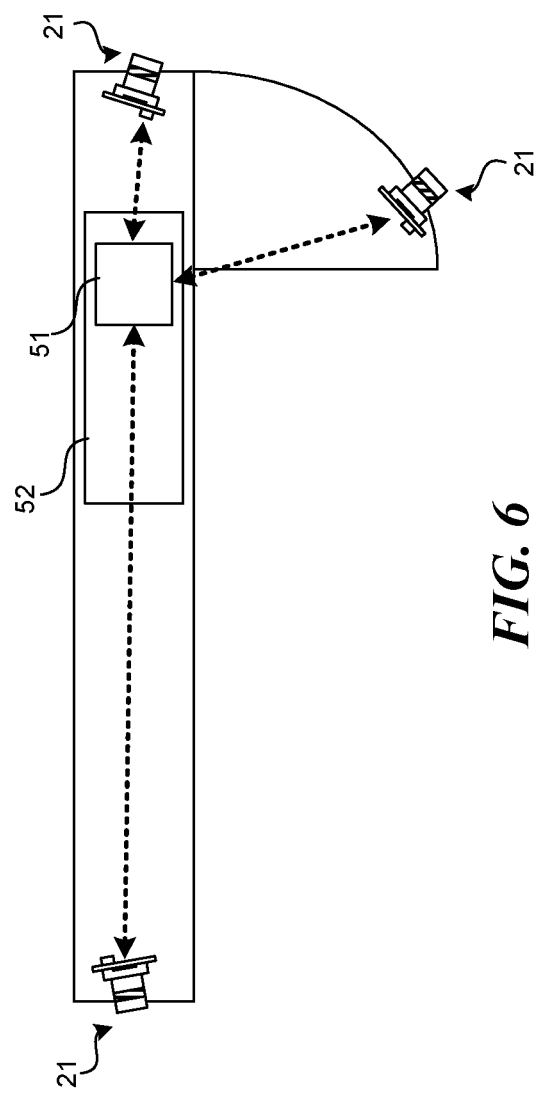
FIG. 6 shows another example of how a sensor with associated tracking sensor and transmitter can be mounted on an HMD device.

Various new design options arise when active sensor position tracking is used as described herein. Target sensors can be mounted directly to the visor or other housing components, eliminating the need for any rigid mounting structure for the target sensors. Hence, cameras or other target sensors can be mounted essentially anywhere on the headset. FIG. 6 illustrates another embodiment of an HMD headset, which includes multiple cameras (sensors) coupled to a transmitter in a virtual rigid framework in a sensor subsystem.

Figure 7:
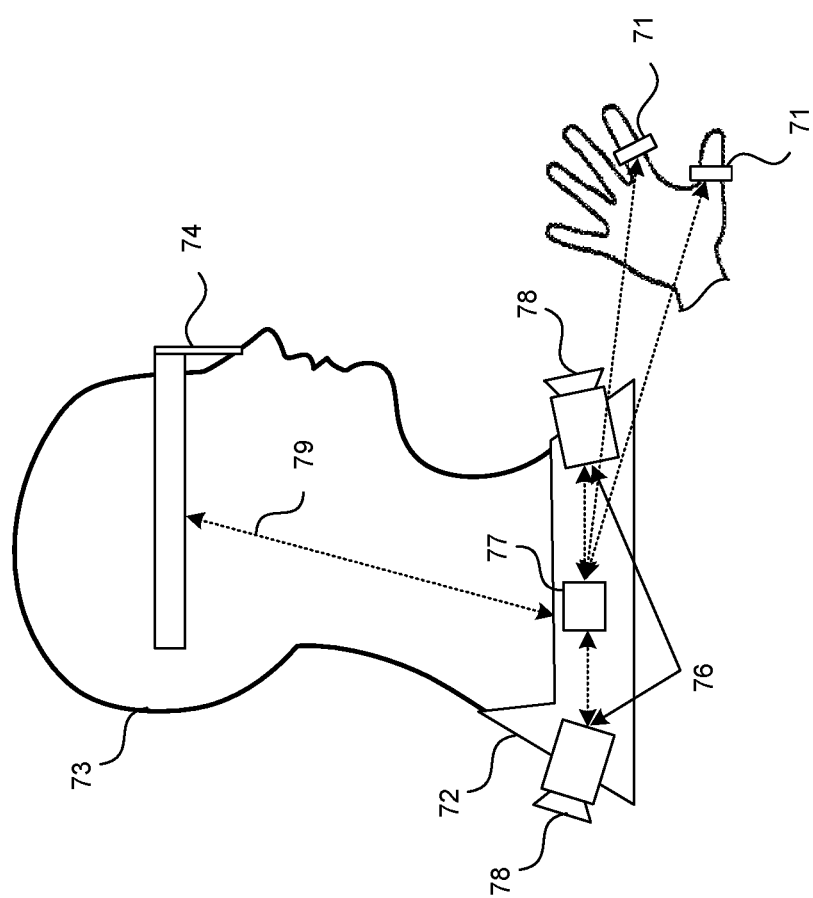
FIG. 7 shows an example of how the non-line-of-sight virtual rigid framework can be used to facilitate wearable sensors that are not physically coupled to a headset.

Furthermore, the target sensors do not necessarily have to be mounted on the headset at all, as illustrated in FIG. 7. For example, the non-line-of-sight virtual rigid framework technique introduced here facilitates integration of wearable target sensors that are not physically coupled to the headset. The target sensors can be built into flexible materials such as clothing. Magnetic tracking sensors 71 can be incorporated into articulated gloves, as shown, and other skeletal tracking systems can be easily integrated in similar manner. In some embodiments, optical tracking can be combined with magnetic tracking for calibration.

In one potential application, represented in FIG. 7, the non-line-of-sight sensor tracking technique introduced here is used to facilitate a "world tracking" subsystem built into a lightweight shoulder pack 72 that can be worn by the user 73 and used conjunction with a very lightweight AR display headset 74. The world-tracking subsystem 76 can be used to precisely track the user's position and orientation in the real world, which information can be used to precisely generate AR display content for the user. The world-tracking subsystem can include an electronics module 77 that contains the transmitter, processor, memory and battery, and world-sensing/tracking components such as cameras. Relative magnetic tracking 79 such as described above can be employed along with virtual rigid framework sensors (such as described above) on the headset 74, to precisely locate the cameras 78 relative to the headset 74.

Figure 8:
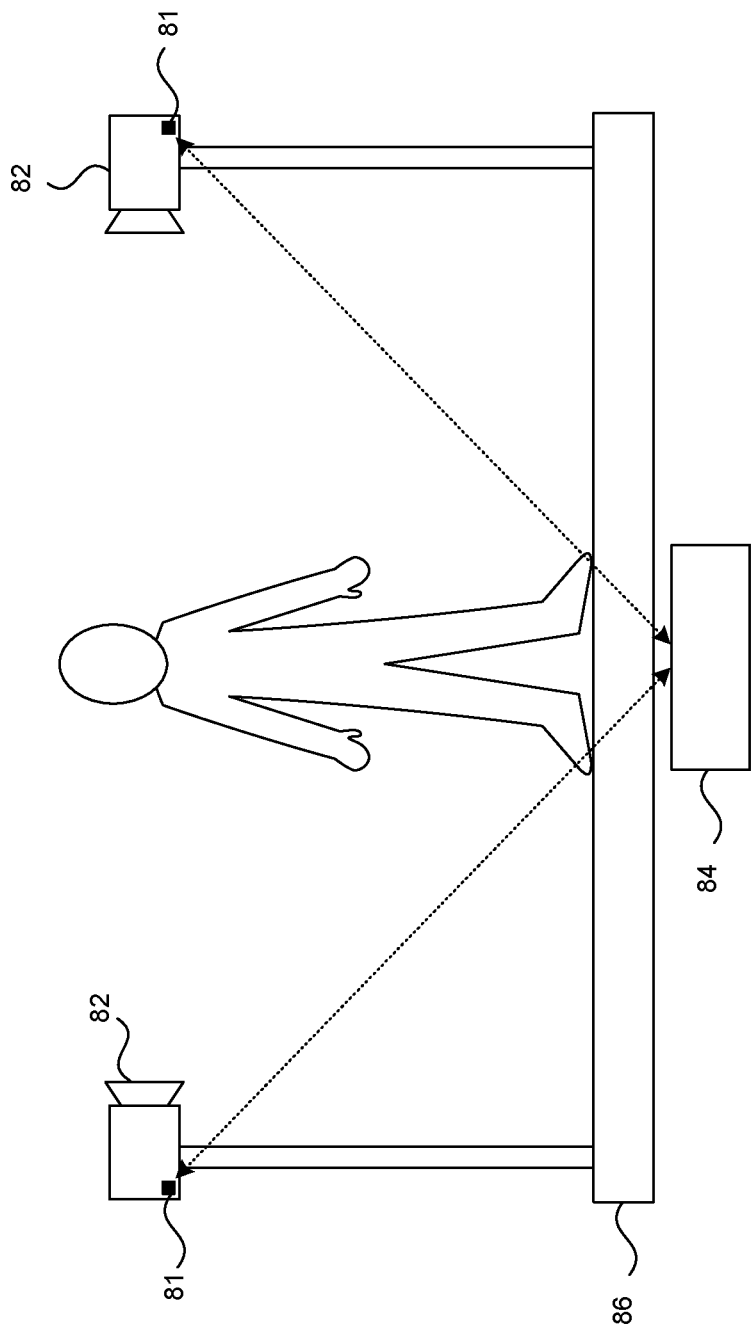
FIG. 8 schematically illustrates a portable holocapture studio that employs a non-line-of-sight virtual rigid framework.

Another potential application of the non-line-of-sight sensor tracking technique introduced here is to improve holocapture technology. The term "holocapture" as used herein refers to the use of video recording technology to acquire 3D display content for use in an AR or VR system. Such techniques generally use multiple video cameras placed fixedly around a "stage," which defines the area to be recorded. Holocapture systems require very precise positional and orientational calibration of the video cameras and, therefore, generally are not portable and not amenable to quick setup and tear down. The non-line-of-sight virtual rigid framework technique introduced here, therefore, can be used to create small, portable holocapture studios. As illustrated in FIG. 8, this can be done, for example, by attaching or integrating magnetic tracking sensors 81 into each holocapture video camera 82, where each video camera 82 is removably yet rigidly mounted on the stage 86, and providing an associated fixed magnetic transmitter 84 that is also removably yet rigidly mounted on the stage 86. Accuracy may be reduced because of increased range; however, this can be mitigated by using a more powerful transmitter, using a magnetic tracker to initialize the camera positions, keeping each camera stationary after initial setup, and/or running online auto-calibration software to refine estimates.

Figure 9:
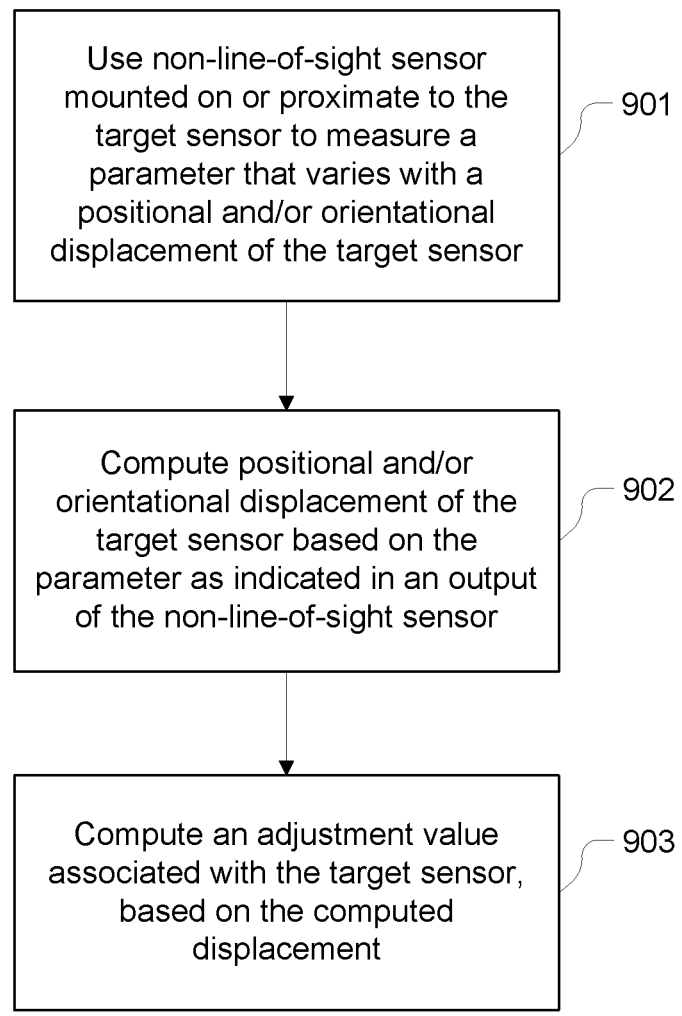
FIG. 9 illustrates an example of a process for performing the non-line-of-sight sensor tracking technique.

FIG. 9 illustrates an example of a process for performing the non-line-of-sight sensor tracking technique introduced here. Initially, at step 901 a non-line-of-sight sensor mounted on or proximate to a target sensor (the sensor to be calibrated), is used to measure a parameter that varies with a positional and/or orientational displacement of the target sensor. The parameter may be, for example, a magnetic field strength and/or direction. At step 902 the process computes a positional and/or orientational displacement of the target sensor based on the parameter as indicated in an output of the non-line-of-sight sensor. At step 903 the process computes an adjustment value associated with the target sensor, based on the computed displacement.

Figure 10:
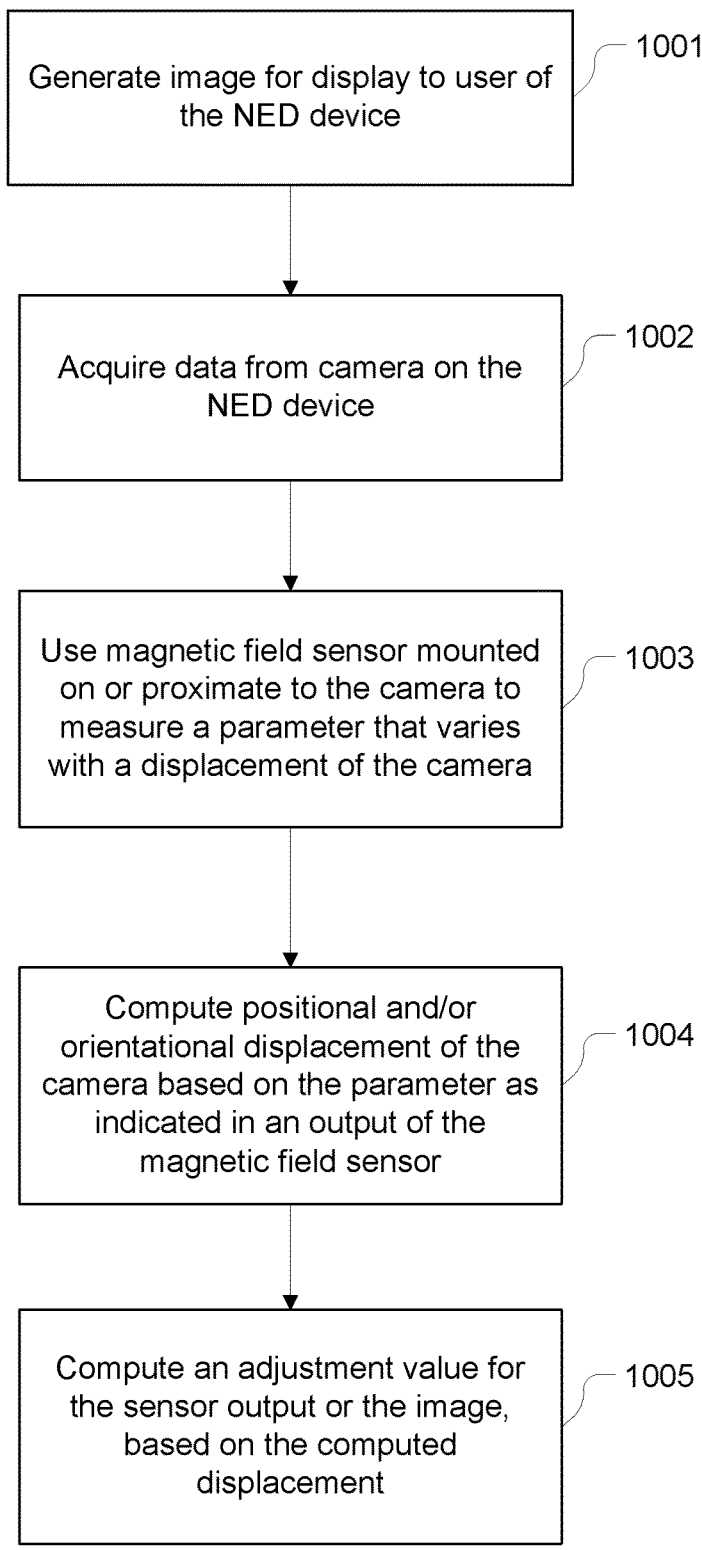
FIG. 10 illustrates an example of a process for performing the non-line-of-sight sensor tracking technique for a camera in an NED device.

FIG. 10 more specifically illustrates an example of a process for performing the non-line-of-sight sensor tracking technique for a camera in an NED device, such as an AR-configured HMD device. It will be recognized, however, the technique has many other possible applications, some of which are described above, particularly but not limited to those in which line-of-sight tracking is impractical. Further, it will be recognized that the same technique can be applied concurrently to multiple cameras and/or other sensors concurrently in the NED device in similar manner. At step 1001, the NED device generates an image for display to user of the NED device. At step 1002 the device acquires data from a camera on the NED device. The camera may be, for example, a head-tracking camera, the output of which is used to generate and/or modify the above-mentioned image. At step 1003 a magnetic field sensor mounted on or proximate to the camera is used to measure a parameter that varies with a displacement of the camera. At step 1004, processing circuitry on the device computes a positional and/or orientational displacement of the camera, based on the parameter as indicated in an output of the magnetic field sensor at step 1005, processing circuitry on the device computes an adjustment value associated with the sensor output or the image, based on the computed displacement.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, means: a) special-purpose hardwired circuitry, such as one or more application-specific integrated circuits (ASICs), programmable logic devices (PLDs), field programmable gate arrays (FPGAs), or other similar device(s); b) programmable circuitry programmed with software and/or firmware, such as one or more programmed general-purpose microprocessors, digital signal processors (DSPs) and/or microcontrollers, system-on-a-chip systems (SOCs), or other similar device(s); or c) a combination of the forms mentioned in a) and b).

EXAMPLES OF CERTAIN EMBODIMENTS

Certain embodiments of the technology introduced herein are summarized in the following numbered examples:

1. A near-to-eye display (NED) device comprising: a display subsystem to generate an image and to direct light representing the image to an eye of a user; a target sensor coupled to the display subsystem; a second sensor mounted on or proximate to the target sensor to measure a parameter that varies with a displacement of the target sensor; and a processor coupled to the second sensor and configured to compute the displacement of the target sensor based on the parameter.

2. The NED device of example 1, wherein the processor is further configured to compute an adjustment value based on the computed displacement.

3. The NED device of example 1 or example 2, wherein the target sensor is a camera.

4. The NED device of any of examples 1 through 3, wherein the second sensor is a magnetic field sensor.

5. The NED device of example 4, wherein the magnetic field sensor comprises coil mounted to a lens barrel of the camera.

6. The NED device of example 4 or example 5, wherein the magnetic field sensor comprises a coil that encircles a lens barrel of the camera.

7. The NED device of any of examples 1 through 6, further comprising: a transmitter to transmit a non-line-of-sight signal detectable by the second sensor.

8. The NED device of any of examples 1 through 7, wherein the transmitter comprises a magnetic field generator.

9. The NED device of example 7 or example 8, further comprising an inertial measurement unit rigidly coupled to the transmitter and configured to measure an orientation of the transmitter.

10. The NED device of any of examples 1 through 10, further comprising: a third sensor and a fourth sensor, each mounted on or proximate to the target sensor to measure the parameter; wherein the processor is configured to compute the displacement of the target sensor and an orientation of the target sensor in six degrees of freedom, based on outputs of the second, third and fourth sensors.

11. An apparatus for dynamically determining a displacement of a target sensor in an electronic system, the apparatus comprising: a non-line-of-sight sensor rigidly mounted on or proximate to the target sensor and configured to measure a parameter that varies with the displacement of the target sensor; and at least one processor coupled to the non-line-of-sight sensor and configured to compute the displacement of the target sensor based on the parameter, and to compute an adjustment value based on the computed displacement.

12. The apparatus of example 11, wherein the non-line-of-sight sensor comprises a magnetic field sensor.

13. The apparatus of example 11 or example 12, wherein the target sensor is a camera.

14. The apparatus of any of examples 11 through 13, wherein the apparatus is a near-to-eye display (NED) device.

15. The apparatus of any of examples 11 through 14, further comprising: a transmitter to transmit a non-line-of-sight signal detectable by the second sensor.

16. The apparatus of example 15, wherein the transmitter comprises a magnetic field generator.

17. The apparatus of any of examples 11 through 16, further comprising: a third sensor and a fourth sensor, each mounted on or proximate to the target sensor to measure the parameter; wherein the processor is configured to compute the displacement of the target sensor and an orientation of the target sensor in six degrees of freedom, based on outputs of the second, third and fourth sensors.

18. A method of operation of a near-to-eye display (NED) device, the method comprising: generating an image for display to a user of the NED device; acquiring data from a camera on the NED device; using a magnetic field sensor mounted on or proximate to the camera to measure a parameter that varies with a displacement of the camera; and computing the displacement of the camera based on the parameter as indicated in an output of the magnetic field sensor.

19. The method of example 19, further comprising: computing an adjustment value based on the computed displacement; and displaying the image based on the adjustment value.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A near-to-eye display (NED) device comprising:
a display subsystem to generate an image and to direct light representing the image to an eye of a user;
a target sensor coupled to the display subsystem;
a second sensor mounted on or proximate to the target sensor to measure a parameter that varies with a displacement of the target sensor, wherein the second sensor is a magnetic field sensor comprising a coil mounted to a lens barrel of the target sensor; and
a processor coupled to the second sensor and configured to compute the displacement of the target sensor based on the parameter.

2. The NED device of claim 1, wherein the processor is further configured to compute an adjustment value based on the computed displacement.

3. The NED device of claim 2, wherein the display subsystem is configured to display the image based on the adjustment value.

4. The NED device of claim 1, wherein the target sensor is a camera.

5. The NED device of claim 1, wherein the magnetic field sensor comprises a coil that encircles a lens barrel of the target sensor.

6. The NED device of claim 1, further comprising:
a transmitter to transmit a non-line-of-sight signal detectable by the second sensor.

7. The NED device of claim 6, wherein the transmitter comprises a magnetic field generator.

8. The NED device of claim 6, further comprising an inertial measurement unit rigidly coupled to the transmitter and configured to measure an orientation of the transmitter.

9. The NED device of claim 8, wherein the processor is configured to further compute the displacement of the target sensor based on the orientation of the transmitter, and to compute an adjustment value based on the computed displacement, and wherein the display subsystem is further configured to display the image based on the adjustment value.

10. The NED device of claim 1, further comprising:
a third sensor and a fourth sensor, each mounted on or proximate to the target sensor to measure the parameter;
wherein the processor is configured to compute the displacement of the target sensor and an orientation of the target sensor in six degrees of freedom, based on outputs of the second, third and fourth sensors.

11. The NED device of claim 1, wherein the parameter comprises at least one of a magnetic field strength or a magnetic field direction.

12. An apparatus for dynamically determining a displacement of a target sensor in an electronic system, the apparatus comprising:
a non-line-of-sight sensor rigidly mounted on or proximate to the target sensor and configured to measure a parameter that varies with the displacement of the target sensor, wherein the non-line-of-sight sensor is a magnetic field sensor comprising a coil mounted to a lens barrel of the target sensor; and
at least one processor coupled to the non-line-of-sight sensor and configured to compute the displacement of the target sensor based on the parameter, and to compute an adjustment value based on the computed displacement.

13. The apparatus of claim 12, wherein the target sensor is a camera.

14. The apparatus of claim 13, wherein the apparatus is a near-to-eye display (NED) device.

15. The apparatus of claim 12, further comprising:
a transmitter to transmit a non-line-of-sight signal detectable by the the non-line-of-sight sensor.

16. The apparatus of claim 15, wherein the transmitter comprises a magnetic field generator.

17. The apparatus of claim 15, further comprising an inertial measurement unit rigidly coupled to the transmitter and configured to measure an orientation of the transmitter.

18. The apparatus of claim 17, wherein the at least one processor is configured to further compute the displacement and the adjustment value based on the orientation of the transmitter, and further comprising a display subsystem configured to display an image based on the adjustment value.

19. The apparatus of claim 12, further comprising:
a third sensor and a fourth sensor, each mounted on or proximate to the target sensor to measure the parameter;
wherein the processor is configured to compute the displacement of the target sensor and an orientation of the target sensor in six degrees of freedom, based on outputs of the the non-line-of-sight sensor, the third sensor, and the fourth sensor.

20. The apparatus of claim 12, wherein the parameter comprises at least one of a magnetic field strength or a magnetic field direction.

21. The apparatus of claim 12, further comprising a display subsystem configured to display an image based on the adjustment value.

22. A method of operation of a near-to-eye display (NED) device, the method comprising:
generating an image for display to a user of the NED device;
acquiring data from a camera on the NED device;
using a magnetic field sensor mounted on or proximate to the camera to measure a parameter that varies with a displacement of the camera, wherein the magnetic field sensor comprises a coil mounted to a lens barrel of the camera; and
computing the displacement of the camera based on the parameter as indicated in an output of the magnetic field sensor.

23. The method of claim 22, further comprising:
computing an adjustment value based on the computed displacement; and
displaying the image based on the adjustment value.

24. The method of claim 22, wherein the parameter comprises at least one of a magnetic field strength or a magnetic field direction.

25. The method of claim 22, further comprising:
transmitting, by a transmitter, a non-line-of-sight signal detectable by the magnetic field sensor; and
measuring, by an inertial measurement unit rigidly coupled to the transmitter, an orientation of the transmitter.

26. The method of claim 25, wherein computing the displacement of the camera is further based on the orientation of the transmitter, and further comprising computing an adjustment value based on the computed displacement, and displaying the image based on the adjustment value.

* * * * *